United States Patent [19]

Lachner

[11] Patent Number: 4,844,238
[45] Date of Patent: Jul. 4, 1989

[54] CURVE-NEGOTIATING ENDLESS CONVEYOR SYSTEM

[75] Inventor: Hans Lachner, Herne, Fed. Rep. of Germany

[73] Assignee: Klockner-Becorit GmbH, Castrop-Rauxel, Fed. Rep. of Germany

[21] Appl. No.: 30,174

[22] Filed: Mar. 25, 1987

[30] Foreign Application Priority Data

Mar. 25, 1986 [DE] Fed. Rep. of Germany ....... 3610001

[51] Int. Cl.⁴ .............................................. B65G 19/18
[52] U.S. Cl. .................................. 198/861.2; 198/834
[58] Field of Search .......................... 198/861.1–861.3, 198/834, 516, 584, 586, 587, 313, 520, 835

[56] References Cited

U.S. PATENT DOCUMENTS

| | | | |
|---|---|---|---|
| 1,073,803 | 9/1913 | Gotuzzo | 198/861.2 X |
| 3,297,146 | 1/1967 | Munger et al. | 198/861.2 |
| 4,339,031 | 7/1982 | Densmore | 198/861.2 |
| 4,538,722 | 9/1985 | Sumner | 198/861.2 |
| 4,588,072 | 5/1986 | Braun et al. | 198/861.2 X |
| 4,618,057 | 10/1986 | Howser | 198/861.2 |

FOREIGN PATENT DOCUMENTS

| | | | |
|---|---|---|---|
| 0413905 | 5/1925 | Fed. Rep. of Germany | 198/834 |
| 1373170 | 11/1974 | United Kingdom | 198/861.2 |
| 2103559 | 2/1983 | United Kingdom | 198/861.2 |
| 2172870 | 10/1986 | United Kingdom | 198/861.2 |

Primary Examiner—Robert J. Spar
Assistant Examiner—Lyle K. Kimms
Attorney, Agent, or Firm—Collard, Roe & Galgano

[57] ABSTRACT

A curve-negotiating conveyor particularly for use in underground mining operations wherein the conveyor can be designed to any desired length since it compensates for the extension of the conveyor track occurring over the extended length of the conveyor without the positively operating driving devices becoming disengaged. The conveyor has a track forcibly guided on an undercarriage, the links of the track being flexibly joined to one another and the track resists tension and compression. The undercarriage is comprised of undercarriage segments being flexibly joined to each other and having limited lengthwise displacement. Some of the individual segments of the undercarriage are connected with driver devices having sprocket wheels that positively engage the conveyor track.

3 Claims, 1 Drawing Sheet

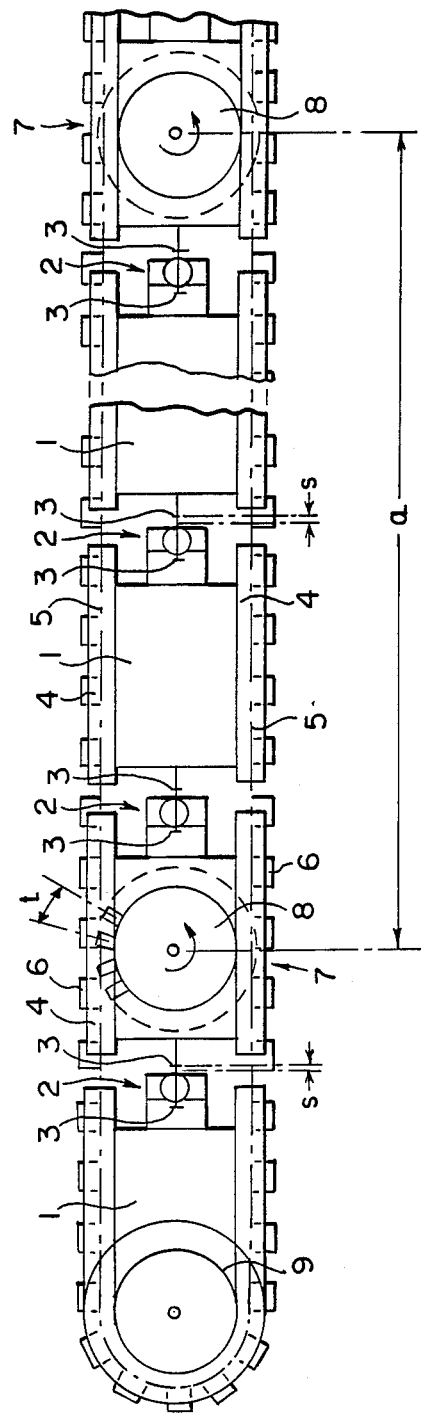

CURVE-NEGOTIATING ENDLESS CONVEYOR SYSTEM

SUMMARY OF THE INVENTION

The invention relates to a conveyor system capable of negotiating curves, in particular, for use in underground mining operations.

BACKGROUND OF THE INVENTION

In certain underground mining operations, conveyors are required that are not only capable of negotiating curves, but are also extremely long in design, for example, up to 200 meters in length, or longer. Such conveyors are required, for example, for chamber working in order to support a curve-negotiating conveyor belt that can follow a continuous mining machine even around curves. A special problem of extremely long conveyor systems is that the conveyor track, under the influence of the driving forces, can elastically expand by up to 1% of its length. Consequently, suitable measures must be provided to compensate for this extension of the track, especially when driving systems are used that operate in a positive manner.

It is therefore an object of the invention to create a curve-negotiating conveyor which can be designed with any desired length without causing problems due to elastic extensions of the conveyor track.

The invention provides a curve-negotiating conveyor system particularly useful for underground mining operations, wherein the conveyor track is forcibly guided in an undercarriage, and has its track links connected to each other with spatial flexibility, as well as with resistance to tension and compression. The undercarriage of the conveyor consists of undercarriage segments joined with each other with spatial flexibility. The segments are connected to each other with limited lengthwise displacement. Each individual segment has driving devices with sprocket wheels positively engaging the conveyor. With the conveyor of the invention, the track extensions which occur due to the forces of driving devices are compensated for by a corresponding lengthwise displacement of the undercarriage segments.

the displacements "s" of the individual undercarriage segments, the spacings "a" of the driving devices, and the pitch "t" of the elements engaging the conveyor track and the driving wheel are adapted to each other so that the sum of the displacement "s" of the undercarriage segments between two driving devices conforms to at least the pitch "t". In this way, each of the driving devices can be displaced relative to the tension and compression resistant conveyor track so as to provide a flawless engagement in the conveyor track.

According to a particularly preferred embodiment of the conveyor of the invention, the sprocket wheels of the driving devices simultaneously engage both the top and bottom strands of the conveyor track, so that the conveyor is maintained at a very low height profile.

Other objects and features of the present invention will become apparent from the following detailed description considered in connection with the accompanying drawing, which discloses a single embodiment of the invention. It is to be understood that the drawing is to be used for the purpose of illustration only, and not as a definition of the limits of the invention.

BRIEF DESCRIPTION OF THE DRAWING

The drawing shows a schematic lateral view of the conveyor system according to the invention.

DETAILED DESCRIPTION OF THE PREFERRED EMBODIMENT

Referring to the drawing, there is shown a conveyor having an undercarriage consisting of a large number of undercarriage segments 1, which are movably joined with each other. Undercarriage segments 1 are joined to each other by ball joints 2. The ball of each ball joint 2 is displaceable between two stop means 3 along the longitudinal direction of the conveyor, so that undercarriage segments 1 remain displaceable against each other by a certain displacement "s" along the longitudinal direction of the conveyor.

At the top and bottom sides, each undercarriage segment 1 is provided with a guide duct 4 for conveyor track 5. Guide ducts 4 of the consecutively arranged undercarriage segments 1 supplement each other to form a forced guidance for track 5. The latter is comprised of track links which resist tension and compression, but are joined to each other with mobility on all sides. Each of the track links are connected to support elements 6 which, during the movement of the conveyor, come to rest on the ground to support the entire conveyor. Some of the undercarriage segments are provided with driving devices 7, each having a drive or sprocket wheel 8 positively engaging the conveyor track. The engaging elements of drive wheel 8 and of track 5 have a pitch "t", whereby the pitch of the former is matched to the one of the latter. At each end, the conveyor is provided with reversing elements 9.

In each case, the displacements "s" in the individual ball joints, the pitch "t" and the spacing "a" of drive devices 7 are adapted to each other in such a manner that the sum of all displacements "s" between two driving devices at least conforms to the pitch "t". In this way, each of drive devices 7 can align itself relative to the tension and compression resistant track 5 so that the engaging elements of drive wheels 8 and of chain 5 can flawlessly engage one another.

While only one embodiment of the present invention has been shown and described, it is obvious that many changes and modifications may be made thereunto, without departing from the spirit and scope of the invention.

What is claimed is:

1. A curve-negotiating conveyor having an undercarriage for use in underground mining operations, comprising:
    an endless conveyor track and plurality of drives having a pitch, said conveyor track having a first predetermined length when untensioned and a second predetermined length when tensioned forcibly guided on the undercarriage and forming a continuous loop thereon, the track links of said conveyor track being joined in a manner permitting spacial flexibility while resisting both tension and compression, said undercarriage comprising undercarriage segments each joined by a ball joint displaceable between two stop means, permitting a predetermined limited longitudinal displacement between said undercarriage segments, a sum of said predetermined longitudinal displacements of said carriage segments upon tensioning said conveyor track being at least equal to the pitch of said conveyor track and drives.

2. The conveyor according to claim 1, wherein the displacement (s) of the individual ball joints, the spacings (a) of two adjacent drives and the pitch (t) of the drives are related to one another so that the sum of the displacements (s) of the ball joints between two adjacent drives at least conforms to the pitch (t).

3. The conveyor according to claim 1, wherein each of said drives having a sprocket wheel simultaneously engaging the top and bottom strands of the conveyor track.

* * * * *